US009691070B2

United States Patent
Wolf

(10) Patent No.: US 9,691,070 B2
(45) Date of Patent: Jun. 27, 2017

(54) AUTOMATED VOICE-BASED CUSTOMER SERVICE

(71) Applicant: EchoStar Technologies L.L.C., Englewood, CO (US)

(72) Inventor: Bradley Wolf, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/842,505

(22) Filed: Sep. 1, 2015

(65) Prior Publication Data
US 2017/0061443 A1     Mar. 2, 2017

(51) Int. Cl.
| | |
|---|---|
| G06F 3/00 | (2006.01) |
| G06F 13/00 | (2006.01) |
| H04N 5/445 | (2011.01) |
| G06Q 30/00 | (2012.01) |
| H04N 21/61 | (2011.01) |
| H04N 21/478 | (2011.01) |
| G10L 15/22 | (2006.01) |
| H04N 21/637 | (2011.01) |
| G10L 15/08 | (2006.01) |

(52) U.S. Cl.
CPC ............ *G06Q 30/016* (2013.01); *G10L 15/08* (2013.01); *G10L 15/22* (2013.01); *H04N 21/478* (2013.01); *H04N 21/6143* (2013.01); *H04N 21/637* (2013.01); *G10L 2015/223* (2013.01)

(58) Field of Classification Search
CPC ........... H04N 21/42222; H04N 21/478; H04N 21/6143; G06Q 30/016; G10L 15/08; G10L 15/22
USPC ................................................ 725/37, 38, 59
See application file for complete search history.

(56) References Cited

U.S. PATENT DOCUMENTS

| | | | |
|---|---|---|---|
| 2004/0093211 A1* | 5/2004 | Reynolds ................ | G10L 15/30 704/235 |
| 2005/0027539 A1* | 2/2005 | Weber ..................... | G08C 17/00 704/275 |
| 2014/0122059 A1* | 5/2014 | Patel .................. | G06F 17/30017 704/9 |

(Continued)

*Primary Examiner* — Kyu Chae
(74) *Attorney, Agent, or Firm* — Seed Intellectual Property Law Group LLP

(57) ABSTRACT

An automated voice-based customer service system assists TV subscribers without engaging a customer service representative at a call center. A spoken user query is captured by a hand-held remote control device equipped with a microphone. The remote control device transmits voice data to a television content receiver and the voice data is sent to an automated customer service system. The automated customer service system decodes the user query and formulates a response. The response is then transmitted back to the television content receiver for presentation to the user as a voice response, on-screen text response, or as a modification to equipment settings. The user is able to converse verbally with the voice-based automated customer service system. Such a protocol assists subscribers in solving most common, routine problems without involvement of a human customer service representative. The automated customer service system can be programmed to process user queries about billing as well as technical difficulties concerning content reception, tuning, or display of television signals, and device connectivity.

15 Claims, 5 Drawing Sheets

(56) References Cited

U.S. PATENT DOCUMENTS

| | | | |
|---|---|---|---|
| 2014/0196092 A1* | 7/2014 | Chung | G10L 15/26 |
| | | | 725/53 |
| 2014/0365222 A1* | 12/2014 | Weider | G06F 17/30864 |
| | | | 704/257 |
| 2015/0143420 A1* | 5/2015 | Mickelsen | G10L 15/30 |
| | | | 725/37 |
| 2015/0237204 A1 | 8/2015 | Beals | |
| 2015/0382047 A1* | 12/2015 | Van Os | H04N 21/42203 |
| | | | 725/38 |
| 2016/0035348 A1* | 2/2016 | Kleindienst | G06F 17/30905 |
| | | | 704/235 |
| 2016/0094889 A1* | 3/2016 | Venkataraman | G06F 17/30029 |
| | | | 725/53 |

* cited by examiner

AUTOMATED VOICE-BASED CUSTOMER SERVICE

BACKGROUND

Technical Field

The present disclosure generally relates to automated customer service systems and, in particular, to an automated customer service that provides voice recognition capability so that a human customer service representative is not needed to serve the needs of television subscribers.

Description of the Related Art

Watching television has become a complicated process that requires viewers to be adept at navigating menus, remote control buttons, and feature settings. Adjusting TV-related settings is a major source of frustration for many viewers. In particular, elderly viewers may have difficulty reading and interpreting icons on remote control buttons and manipulating the buttons to step through menus displayed on the TV screen. In order to preserve their subscriber base, TV content providers (e.g., Dish Network®) maintain call centers to field customer service calls from subscribers regarding installed subscriber equipment. In response to a real or perceived equipment failure or an operational anomaly, a TV subscriber may contact the TV content provider customer service department, by telephone or e-mail.

Customer service is now one of the largest business expenses for TV content providers. One reason customer service is so expensive is that calls are fielded by human customer service representatives (CSRs). Yet, most TV service calls are for routine problems that are easy to troubleshoot and could be solved in an automated fashion without involving a human being. For example, historical records among TV content providers indicate that some of the most common customer service complaints are solved by simply replacing the subscriber's remote control batteries.

In the past, customer service protocols have been automated using a numerical telephone keypad as an interactive device. When a customer places a service call, choices are presented to the customer by a telephone recording. The call is then routed according to customer selections made by entering a number, or in some cases, by speaking a number or a prescribed phrase, with limited voice recognition. For example, a telephone caller may be directed through a series of menus to provide information about their problem and equipment set-up, so that initial steps of troubleshooting can be performed automatically without engaging the customer service representative. However, such a system can become another source of customer frustration, which just adds to subscriber dissatisfaction instead of alleviating it. As a result, subscribers often attempt to bypass the menu-driven telephone automation system so they can speak directly to a human customer service representative.

BRIEF SUMMARY

A system is disclosed that provides fully automated voice-based customer service to TV subscribers without engaging a customer service representative at a call center. A spoken user query is captured by a hand-held remote control device equipped with a microphone. The remote control device can be in the form of a traditional remote control, or, for example, a smart phone programmed with remote control functions. The remote control device transmits voice data to a remote automated customer service system, e.g., a cloud-based system. The automated customer service system decodes the user query and formulates a response. Formulating the response may entail consulting a health server system database that monitors the customer's subscriber equipment status, or a weather database that monitors conditions at the customer's location. The response is then transmitted back to the remote control for presentation to the user as a voice response. In this way, the user is able to converse verbally with the automated customer service system. Such a protocol can provide assistance to subscribers to solve a majority of common, routine problems without involvement of a human customer service representative. The automated customer service system can be programmed to process user queries about billing as well as technical problems concerning content reception, tuning, or display of television signals. The automated customer service system disclosed is also suitable for use in businesses other than media content providers.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

Figure 1:
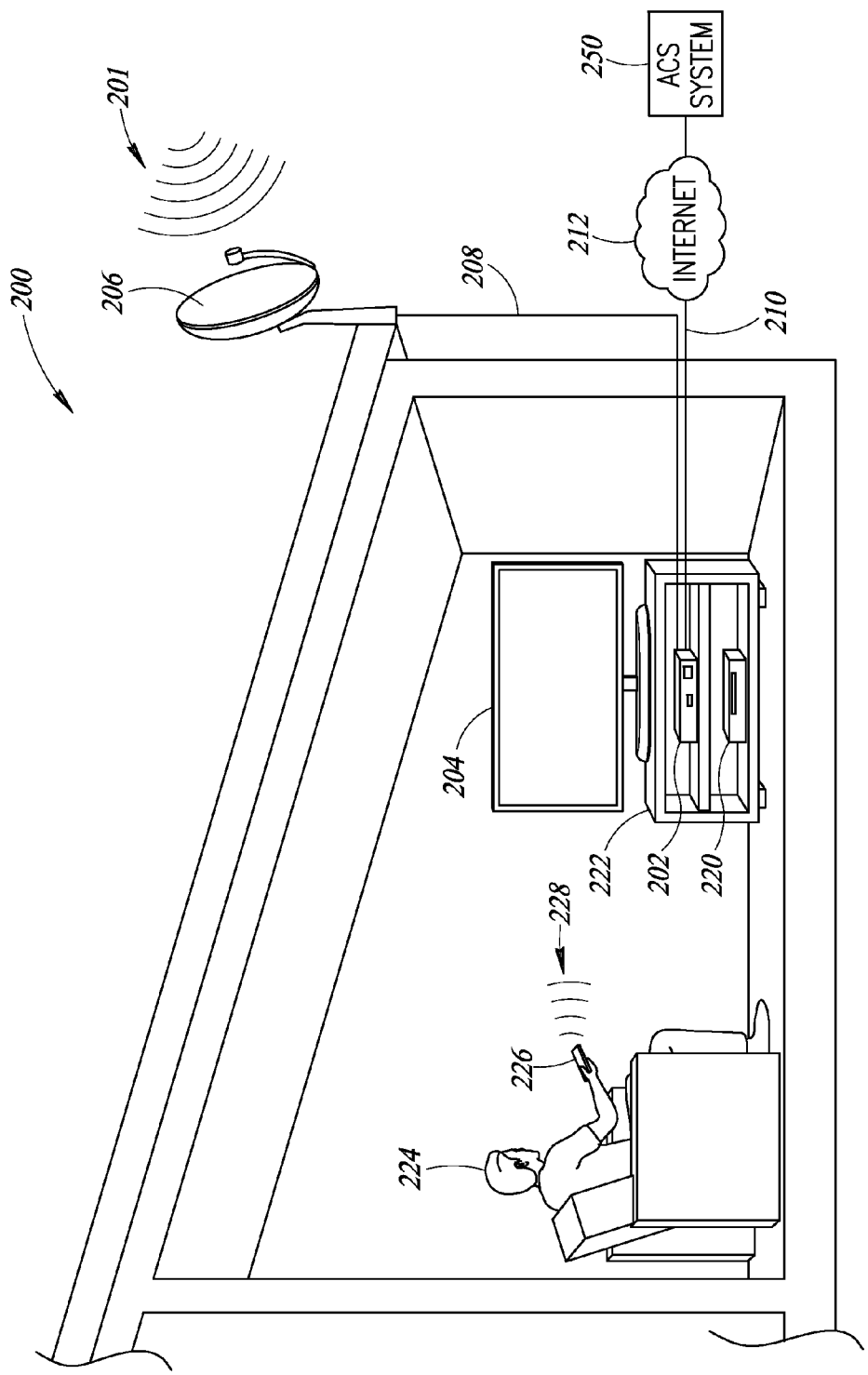
FIG. 1 is a schematic illustration of an exemplary residential media entertainment system equipped with an automated, voice-based customer service feature, according to one embodiment described herein.

In the following description, certain specific details are set forth in order to provide a thorough understanding of various aspects of the disclosed subject matter. However, the disclosed subject matter may be practiced without these specific details. In some instances, well-known structures and methods of providing automated customer service that pertain to embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

This detailed description is not meant to limit the disclosure to any specific embodiment. In this specification, embodiments of the present disclosure illustrate a subscriber satellite television service as an example. The present disclosure is equally applicable to cable television systems, broadcast television systems, Internet streaming media systems, or other television or video distribution systems that include user hardware, typically in the form of a receiver or set top box that is supported by the media provider or by a third party maintenance service provider. Such hardware can also include, for example, digital video recorder (DVR) devices and/or digital-video-disc (DVD) recording devices or other accessory devices inside, or separate from, the set top box.

Throughout the specification, the term "subscriber" refers to an end user who is a customer of a media content provider and who has an account associated with the media content provider. Customer service supports the use of subscriber equipment that resides at the subscriber's address. The subscriber equipment typically includes a signal delivery component such as a coaxial cable or a roof-mounted parabolic antenna, one or more receivers such as a set top box (STB), a digital video recorder (DVR), which may be external or internal to the STB, and remote control devices that viewers use to communicate with their STBs. The terms "user" and "viewer" refer to anyone using part or all of the entertainment system components described herein. The term "customer" refers to a person who places a service call.

Throughout the specification, the acronym "IVR," which stands for interactive voice response, refers to any form of interactive response, for example, a message-based interaction, and is not limited to conventional voice-based IVRs. IVRs are widely known as telephone scripts that guide callers through a customer service menu of options. Callers are instructed to enter digits via a telephone keypad to narrow down the subject of their inquiry, to receive more efficient customer service. In the event that a script executed by an IVR system is implemented via e-mail or text messaging instead of via telephone, the IVR system as described in embodiments herein is meant to include such a data-based script.

One skilled in the art will recognize that the present disclosure can also apply to other types of systems that offer technical support to end users. Such systems can include computer systems, networking systems, telephone systems, industrial equipment systems, medical equipment systems, and the like. While the disclosure shows and describes media-related embodiments, it will be understood by those skilled in the art that various other changes in the form and details may be made therein without departing from the spirit and scope of the invention.

The disclosure uses the term "signal" in various places. One skilled in the art will recognize that the signal can be any digital or analog signal. Those signals can include, but are not limited to, a bit, a specified set of bits, an A/C signal, or a D/C signal. Uses of the term "signal" in the description can include any of these different interpretations. It will also be understood to one skilled in the art that the term "connected" is not limited to a physical connection but can refer to any means of communicatively or operatively coupling two devices.

As a general matter, the disclosure uses the terms "television converter," "receiver," "set top box," "television receiving device," "television receiver," "television recording device," "satellite set top box," "satellite receiver," "cable set top box," "cable receiver," and "content receiver," to refer interchangeably to a converter device or electronic equipment that has the capacity to acquire, process and distribute one or more television signals transmitted by broadcast, cable, telephone or satellite distributors. DVR and "personal video recorder (PVR)" refer interchangeably to devices that can record and play back television signals and that can implement playback functions including, but not limited to, play, fast-forward, rewind, and pause. As set forth in this specification and the figures pertaining thereto, DVR and PVR functionality or devices can be combined with a television converter. The signals transmitted by these broadcast, cable, telephone, satellite, or other distributors can include, individually or in any combination, Internet, radio, television or telephonic data, and streaming media. One skilled in the art will recognize that a television converter device can be implemented, for example, as an external self-enclosed unit, a plurality of external self-enclosed units, or as an internal unit housed within a television. One skilled in the art will further recognize that the present disclosure can apply to analog or digital satellite set top boxes.

As yet another general matter, it will be understood by one skilled in the art that the term "television" refers to a television set or video display that can contain an integrated television converter device, for example, an internal cable-ready television tuner housed inside a television or, alternatively, that is connected to an external television converter device such as an external set top box connected via cabling to a television. A further example of an external television converter device is the EchoStar Hopper combination satellite set top box and DVR.

A display may include, but is not limited to: a television screen, a monitor display, an interlaced video display, a non-interlaced video display, phase alternate line (PAL) display, National Television System Committee (NTSC) systems display, a progressive scan display, a plasma display, a liquid crystal display (LCD) display, a cathode ray tube (CRT) display and various High Definition (HD) displays, an IMAX™ screen, a movie screen, a projector screen, etc.

Specific embodiments are described herein with reference to automated customer service systems that have been produced; however, the present disclosure and the reference to certain materials, dimensions, and the details and ordering of process steps are exemplary and should not be limited to those shown.

Turning now to the drawings, FIG. 1 illustrates an exemplary media subscription service environment that includes a content receiver system 200 and an automated customer support system 250, according to one embodiment. A basic content receiver system 200 includes a content receiver 202, also called a set top box 202 in some systems, communicatively coupled to a source of media content, for presentation on a display 204. The media content is provided as a media signal 201. The automated customer support system 250 connects the subscriber 224 to a source of ongoing support for subscriber equipment, including both hardware and software, supplied by a media content provider.

In the exemplary embodiment shown in FIG. 1, the content receiver system 200 is a home media entertainment system, the media signal 201 is a satellite signal received by the rooftop-mounted satellite receiving antenna 206, and the automated customer support system 250 is associated with a satellite television subscription service. The content receiver is a set top box 202 that receives media content from the satellite receiving antenna 206 via a communication link 208.

While the set top box 202 is described herein as being connected to a satellite receiving antenna 206, in other embodiments the set top box 202 can receive media content from other sources. For example, the set top box 202 can receive media content via an antenna that receives terrestrial broadcast signals. Alternatively, the set top box 202 can receive media content via the media signal 201 received via a broadband cable subscriber service. Additionally or alternatively, the set top box 202 can receive media content via the media signal 201 received directly from the Internet 212 via a network communication link 210, using an Internet-based media subscription service such as, for example, Netflix®, Hulu®, Amazon Prime®, or the like. Furthermore, a content provider may provide to the subscriber multiple media signals 201 via satellite (as shown) and/or via the Internet, broadband cable and/or Internet, or in any other suitable way.

The set top box 202 can be coupled to a television, or the set top box 202 can be in the form of hardware built into a television, wherein the set top box receives content from the media content provider. Alternatively, the set top box 202 can be any electronic device that receives media content by accessing the Internet 212; for example, a gaming console, a smart phone, a tablet computer, a laptop computer, or a desktop computer.

The display 204 can be any kind of video display device such as a cathode ray tube display, a liquid crystal display (LCD), a plasma display, a television, a computer monitor, a rear projection screen, a front projection screen, a heads-up display, or any other electronic display device. The display 204 can include audio speakers, or the display 204 can be coupled to separate audio speakers. The term "for display" as used herein generally includes presentation of an audio component as well as a video component of the media signal 201.

The communication links 208 and 210 typically are wired connections such as one or more coaxial cables. One skilled in the art will recognize that other methods and other systems of delivering the media signal 201 to the set top box 202 may be possible. For example, one or both of the communication links 208 and 210 can be wireless links.

The content receiver 202 optionally further includes one or more peripheral devices 220 such as a media playback device including, but not limited to, a DVD player, a VCR, a stereo, a television, a game console, or a stand-alone DVR device that provides an alternate source of content directly to the display 204 via a wireless or a wired connection 222. Any of the peripheral devices 220 can be subscriber-owned devices, or they can be supplied by the media subscription service. When a peripheral device 220 is subscriber-owned, the subscription service as described herein may provide support for interfacing other components of the content receiver system 200 and the automated customer support system 250 to the subscriber-owned peripheral device 220.

The remote control 226 can be operated by a user, for example, the subscriber 224, to cause the set top box 202 to present received content on the display 204. The remote control 226 may also be used by a viewer to display a programming guide and to communicate program selections to the set top box 202. The remote control 226 is communicatively coupled to the set top box 202 via a wireless path 228, for example, an infrared (IR) signal, Bluetooth® signal, or the like. The remote control 226 can be used to send commands to the satellite set top box 202, including channel selections, display settings, and DVR instructions. The wireless path 228 can use, for example, infrared or UHF transmitters within the remote control 226. One example of an embodiment of the remote control 226 is the EchoStar Technologies Corporation 40.0 Remote Control that includes an IR transmitter and an ultra-high frequency (UHF) transmitter. The remote control 226 may be able to send signals to the peripheral devices 220 that form part of the content receiver system 200. The set top box 202 may also be able to send signals to the remote control 226, including, but not limited to, signals to configure the remote control 226 to operate the other peripheral devices in the content receiver system 200. In some embodiments, the remote control 226 has a set of Light Emitting Diodes (LEDs). Some remote controls can include Liquid Crystal Displays (LCDs) or other screens. The remote control 226 can include buttons, dials, or other man-machine interfaces. While the remote control 226 can often be the common means for a user to communicate with the satellite set top box 202, one skilled in the art will recognize that other means of communicating with the set top box 202 are available, including, but not limited to, attached keyboards, smart phones, front panel buttons or touch screens.

The satellite receiving antenna 206 receives media content via the media signal 201 from one or more satellite transponders in earth orbit. Each satellite transponder is, for purposes of the content receiver system 200, a source of content that transmits one or more media channels, such as HBO, ESPN, pay-per-view channels, etc., to the satellite receiving antenna 206. A satellite television distributor can transmit one or more satellite television signals to one or more satellites. Satellite television distributors can utilize several satellites to relay the satellite television signals to the subscriber 224. Each satellite can have several transponders. Transponders transmit the satellite signal from the satellite to the satellite receiving antenna 206.

The satellite receiving antenna 206 can focus the satellite signal on one or more low-noise block filters (LNBF), also referred to as low-noise block down converters (LNBDC). The LNBFs can de-polarize and initially process the signal. This initial processing can include filtering noise from the signal and down-converting the signal. Down-conversion is sometimes required to transmit the satellite signal through the communication link 208.

Figure 3:
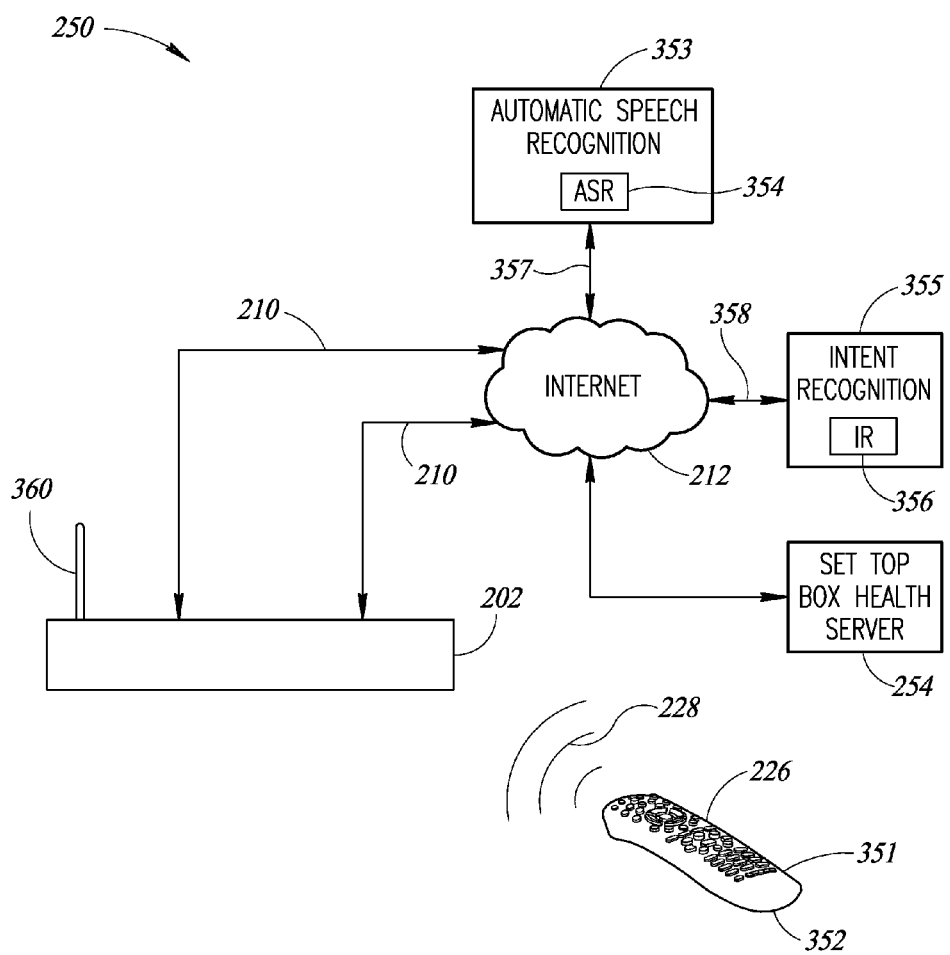
FIG. 3 is a block diagram showing components of an automated, voice-based customer service system, according to one embodiment.

The set top box 202 is also coupled, by the network communication link 210, to remotely-located elements of the Internet-based automated customer service system 250, as described herein with reference to FIG. 3. The automated customer service system 250 may further have access to an existing equipment health server, interactive voice response (IVR) system, and customer service call center. Such a customer service call center provides a staff of human customer service representatives (CSRs) in case a subscriber query cannot be handled in an automated fashion.

Figure 2:
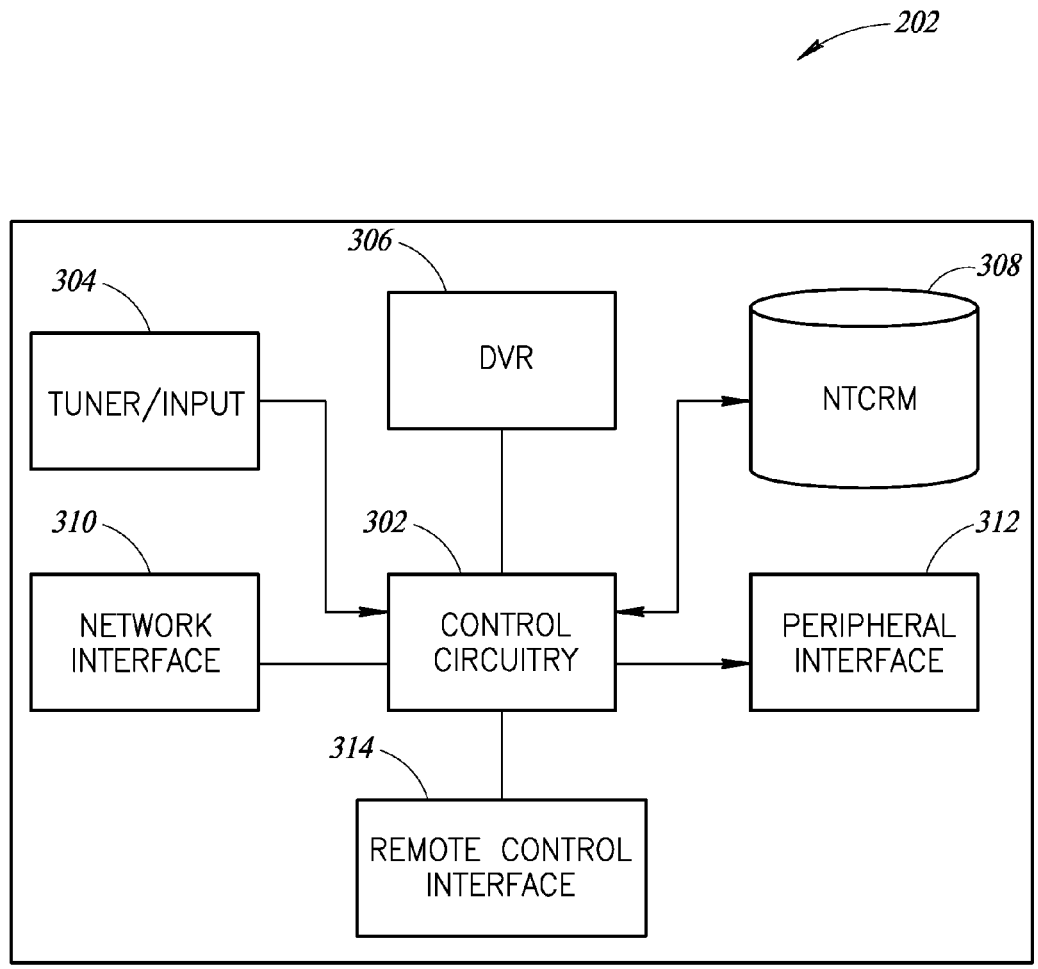
FIG. 2 is a block diagram showing components of a television content receiver in which an automated, voice-based customer service feature is implemented, according to the prior art.

FIG. 2 shows components of a typical set top box 202 that is used in combination with an embodiment of the present disclosure. Components of the set top box 202 include control circuitry 302, one or more tuning devices 304, an optional internal digital video recorder (DVR) 306, a memory 308, a network interface 310, a peripheral interface 312, and a remote control interface 314.

Generally, the set top box 202 can receive one or more television signals from a media provider such as a cable television distributor, a broadcast television distributor or a satellite television distributor. In the embodiment shown, the content receiver system 200 receives signals from a satellite television distributor via the satellite set top box 202. One skilled in the art will recognize that set top box 202 can also receive video from digital subscriber line (DSL), Internet, wireless and other signals from content or video distributors. The set top box 202 can process television signals and can send the processed signals to peripheral electronic devices, such as the display 204 and the remote control 226. The set top box 202 also can accept commands from the remote control 226 or other peripheral electronic devices. More detail about the functionality of the set top box 202 is provided below. One skilled in the art will recognize that many embodiments of the content receiver system 200 are possible and within the scope of this disclosure. Other such embodiments can include, but are not limited to, various combinations or permutations of devices and connections for the delivery, storage, and display of communications, content and other data.

In one embodiment, the set top box 202 receives media content from the satellite receiving antenna 206. The tuning device 304 tunes into a selected media channel received by the satellite receiving antenna 206 to acquire a satellite signal. The tuning device 304 can initially process the satellite signal. The tuning device 304 can also receive subscriber commands in the form of signals from the control circuitry 302. Signals from the control circuitry 302 can include, but are not limited to, a signal to tune to a transponder as part of the process of selecting a certain channel for viewing on a peripheral device. The tuning device 304 transmits the acquired satellite signal to the control circuitry 302 where the signal can undergo extensive signal processing.

Furthermore, the set top box 202 can include multiple tuning devices 304. This allows the set top box 202 to record two or more programs that air simultaneously. Generally, the set top box 202 can record one show at a single time for each tuning device 304 that the set top box 202 includes. For example, if the set top box 202 includes two tuning devices 304, then the set top box 202 can record two media programs simultaneously. Thus if there is a recording conflict between two programs, the set top box 202 can still record both programs because it has two tuners. If a recording conflict occurs because the number of tuning devices 304 is less than the number of programs that the subscriber 224 wants to view or record, the control circuitry 302 can be programmed to resolve the conflict by prioritizing certain media content according to the subscriber's directions, or automatically, based on various criteria.

A first step in signal processing by the control circuitry 302 can include, for example, demodulating the satellite signal. Further signal processing can include error checking. One skilled in the art will recognize that systems with analog data or combined analog and digital data are also possible and contemplated herein.

The DVR 306 can be used to record programs locally in the set top box 202. For example, while viewing the programming guide the user may notice a TV show that is not broadcast at a convenient time. By using the remote control 226 the user can command the set top box 202 to record the TV show to the DVR 306 so that the user may view the TV show at a later convenient time. When the user selects a program to be recorded to the DVR, the set top box 202 sets a recording timer that causes the set top box 202 to automatically record the selected program at the scheduled time. At a time convenient to the user, the user can operate the remote control 226 to cause the set top box 202 to display a list of programs that have been recorded to the DVR. The user can select the desired program from the list of recorded programs, and the set top box 202 will play back the selected program.

Alternatively, the set top box 202 may access, via the Internet 212, recorded programs stored on a remote storage device. In this case, when the user of the set top box 202 selects a media program to be recorded, the media program is recorded to remote storage instead of to the DVR 306 inside the set top box 202. The user of the set top box 202 can schedule media program recordings by accessing the Internet 212 through a smart phone, a PC, a tablet, a laptop, or other suitable means. The user can log into an account associated with the set top box 202 and can schedule recordings via the Internet 212. The media programs can be viewed by connecting the set top box 202 to the Internet 212 to access the remote storage device.

As the user selects multiple programs to be recorded to the DVR 306, it is possible that two or more of the media programs will have a time conflict in their scheduled air times. When the set top box 202 determines that there is a time conflict between two media programs which are both scheduled to be recorded, the set top box 202 follows a particular protocol to automatically assign respective priority levels to the two media programs. The media program that has a higher priority will be recorded at the expense of the media program that has the lower priority if the conflict cannot be resolved. The set top box 202 can store in the memory 308 instructions that operate the DVR 306 according to such a protocol.

The satellite set top box 202 can be connected to the display 204 and the peripheral devices 220 through a peripheral interface 312. Such peripheral devices can send and receive signals to and from the satellite set top box 202. For instance, a television can receive video and audio signals, whereas a stereo can receive only audio signals. A camcorder, on the other hand, can send video or audio signals to the satellite set top box 202 or receive audio and video signals from the set top box 202 to record. As another example, the peripheral interface 312 can include a microprocessor and associated electronic components to permit an interface to content security devices such as an external smart card. The peripheral interface 312 can then encrypt or decrypt content for output to other peripheral devices. Thus, the peripheral interface 312 can perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices can include many types of commercially available electronic devices.

Another peripheral device and connection to the satellite set top box 202 can include a phone line and modem. Set top box 202 can use a modem and phone line to communicate with one or more outside entities or systems (e.g., satellite television distributor). The phone line can carry local or long-distance telephone service. One skilled in the art will recognize that the phone line can also carry other services, including, but not limited to, DSL service. These communications can include requesting pay-per-view programming, reporting of purchases (for example, pay-per-view purchases), obtaining updates to subscriber programming (e.g., updating EPG data), or receiving updates to software on the satellite set top box 202. For example, the phone line can communicate with the satellite set top box 202 using an RJ-11 style telephone connection. One skilled in the art will recognize that there are many other uses for this phone line connection. For example, EPG data can be transmitted to set top box 202 via a phone line or in the medial signal 201. One skilled in the art will recognize that the EPG data can be transmitted to set top box 202 by various other methods, systems and outside entities. Also, one skilled in the art will recognize that a phone line connection to the media content provider can represent other communication connections, including, but not limited to, wireless, Internet, or microwave communications connections. Another function of the phone line can be to periodically receive the EPG data. One skilled in the art will also recognize that a phone line connection can permit networked communications with other network-ready devices using the telephone wiring within a subscriber's location.

The network interface 310 provides network connectivity, for example, to the Internet 212 via a wireless router or a local area network. The peripheral interface 312 can include components that permit connection of RJ-45 network cabling and transmission of TCP/IP traffic to other connected devices. As another example, a wireless router can be attached via the peripheral interface 312 to allow wireless local-area-network (WLAN) data communications using a standard wireless networking protocol such as WiMAX, 802.11b or 802.11g. One skilled in the art will recognize that various other network connections to the set top box 202 are possible.

The remote control interface 314 includes instructions that allow a user to communicate with the satellite set top box 202, and can be implemented using the peripheral interface 312 or by connecting a separate remote control interface device. The remote control interface 314 can translate an input from the user into a format understandable by the control circuitry 302. The remote control interface 314 can thus be considered a user interface (UI). The translation systems can include, but are not limited to, electronic receivers and electronic relays. The remote control interface 314 can receive commands from more than one remote control 226. The remote control 226 can use infrared, UHF, or other communications technology. The remote control 226 can include a microphone, for example, a condenser microphone for receiving voice commands, and/or a built-in speaker. One skilled in the art will recognize that other means to receive and translate user inputs are possible.

It is in the interest of the media content provider to ensure that the subscriber 224 has a very good experience obtaining customer service, and thus continues to use the media content provider for the long term, paying their subscription fee and encouraging others to subscribe. To provide a good experience, the content provider will want to ensure that as few problems with the subscriber equipment occur as possible and, in the event problems do occur, to solve the problems quickly and also make the subscriber 224 feel that a high quality of customer service is being provided.

One way to provide high-quality customer service is to have a large number of service representatives and a large number of call centers standing by at all times to immediately handle any phone calls that come in describing problems with the service being provided. Unfortunately, creating call centers costs money, since telephone lines, desks, and office space needs to be provided. In addition, each call service representative requires training as well as continued pay and benefits for providing customer support. It is therefore desirable to provide highly qualified and well-trained customer service representatives but to ensure that they only deal with the major problems which cannot be solved by other techniques as described herein according to the various embodiments.

One such technique entails monitoring the hardware components or associated software described above with reference to FIG. 2 by a remote health server for signs of failure or faulty operation, and storing monitor data in an associated health server database. Such a health server is described, for example, in U.S. patent application Ser. No. 14/185,723, which was published as U.S. Patent Application Publicaton No. 2015/0237204, and issued as U.S. Pat. No. 9,621,724 on Apr. 11, 2017. The remote health server and the health server database are located at a content provider location or a third party server facility that is remote from the location of the content receiver system 200. Information stored in the remote health server is accessible by the content provider, but not by the subscriber. Monitor data stored in the health server database can be forwarded to one or more other remote servers for use in responding to an automated customer service call.

FIG. 3 shows an exemplary automated customer service system 250 providing assistance to television subscribers on request. In one embodiment, the automated customer service system 250 includes the television content receiver or set top box 202 and the remote control 226, equipped with a microphone 351 and, optionally, a built-in speaker 352.

The Automated Customer Service (ACS) system 250 further includes a first server that is an automatic speech recognition (ASR) server 353, and a second server that is an intent recognition (IR) server 355. The content receiver 202 is communicatively coupled to the ASR server 353 and the IR server 355 by a network such as the Internet 212.

The ASR server 353 is equipped with an ASR engine 354 that performs automated speech recognition, and the IR server 355 is equipped with an intent recognition (IR) engine 356 to perform intent recognition, according to the arrangement shown in FIG. 3. The ASR engine 354 can be in the form of coded instructions for execution by a microprocessor within the ASR server 353. The ASR engine 354 can perform speech recognition functions implemented as code or as specialized electronic hardware components. For example, the ASR engine 354 can perform the speech recognition functions by using either a general-purpose microprocessor programmed with speech recognition instructions, or by using a dedicated voice recognition controller unit. In one embodiment, the ASR engine 354 is provided by a third party, for example, an existing provider of speech recognition services such as Nuance Communications, Inc. of Burlington, Mass. In such an embodiment, the ASR server 353 also functions as a web server and the automatic speech recognition function is performed by a web-based application that receives input through a web site. The ASR server 353 can be a cloud-based server located anywhere, and coupled to the set top box 202 via the Internet 212 or via a direct satellite connection. The ASR server 353 can be coupled to the Internet 212 by either a wired or a wireless ACS signal path 357. The ASR server 353 may also perform additional functions related to speech recognition.

In one embodiment, speech recognition capability is provided by the provider of the entertainment content i.e., by a satellite TV or cable TV content provider, in the form of speech recognition instructions and/or a voice recognition controller unit within the ASR server 353 that is built into the content receiver 202, or located remotely from the content receiver as shown in FIG. 3.

In one embodiment, when a smart phone is configured for use as the remote control 226, voice recognition capability on board the smart phone, or provided by the smart phone service provider, can perform the function of the ASR engine 354 locally.

In one embodiment, the IR server 355 is located at a remote data center, for example, at a cloud-based server farm that includes a data repository. The IR engine 356, in the form of coded instructions for execution by a processor within the IR server 355, can be provided by a third party, for example, data analytics software available from Rovi Corporation of Santa Clara, Calif. Furthermore, the IR server 355 that is equipped with the IR engine 356 also can be provided by a third party. The IR server 355 can be co-located with the ASR server 353, for example, so that functions of both the first and IR servers can be implemented on a common server platform. The IR server 355 is coupled to the Internet 212 by a signal path 358 that can be wired or wireless. Additionally or alternatively, one or the other or both of the ASR server 353 and the IR server 355 can be communicatively coupled wirelessly to the set top box 202 via an STB antenna 360 and a satellite link.

The automated customer support system 250 may communicate with a health server that proactively monitors the health of the subscriber's installed equipment and stores associated equipment health data in a system health database. The health data pertains to relevant pieces of the content receiver system 200. Upon recognizing potential weak points or breaking points in the system, the automated customer support system carries out the repair of such items prior to the content receiver system 200 going out of service, or notifies the subscriber 224 to take certain steps to avoid the components from going out of service so that they are replaced and repaired without an interruption to the subscriber's 224 service. Accordingly, the health server may monitor components of the content receiver system 200, continuously evaluate their health and performance, and store maintenance and system health records in the health server database. Such a database is described further in U.S. patent application Ser. No. 14/185,723, was published as U.S. Patent Application Publication No. 2015/0237204, and issued as U.S. Pat. No. 9,621,724 on Apr. 11, 2017.

Figure 4:
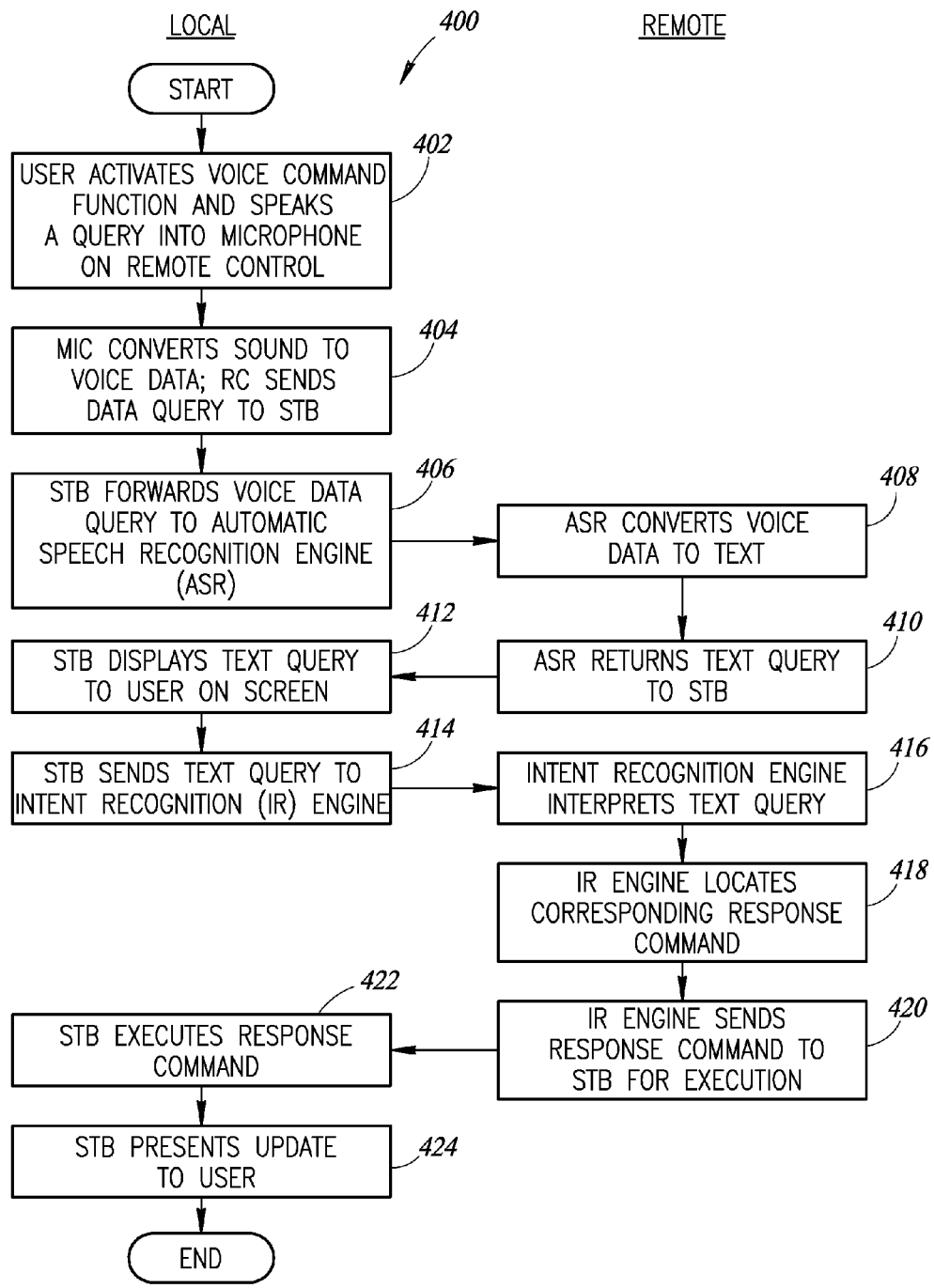
FIG. 4 is a flow diagram showing steps in a method of providing automated voice-based customer service, according to one embodiment.
Figure 5:
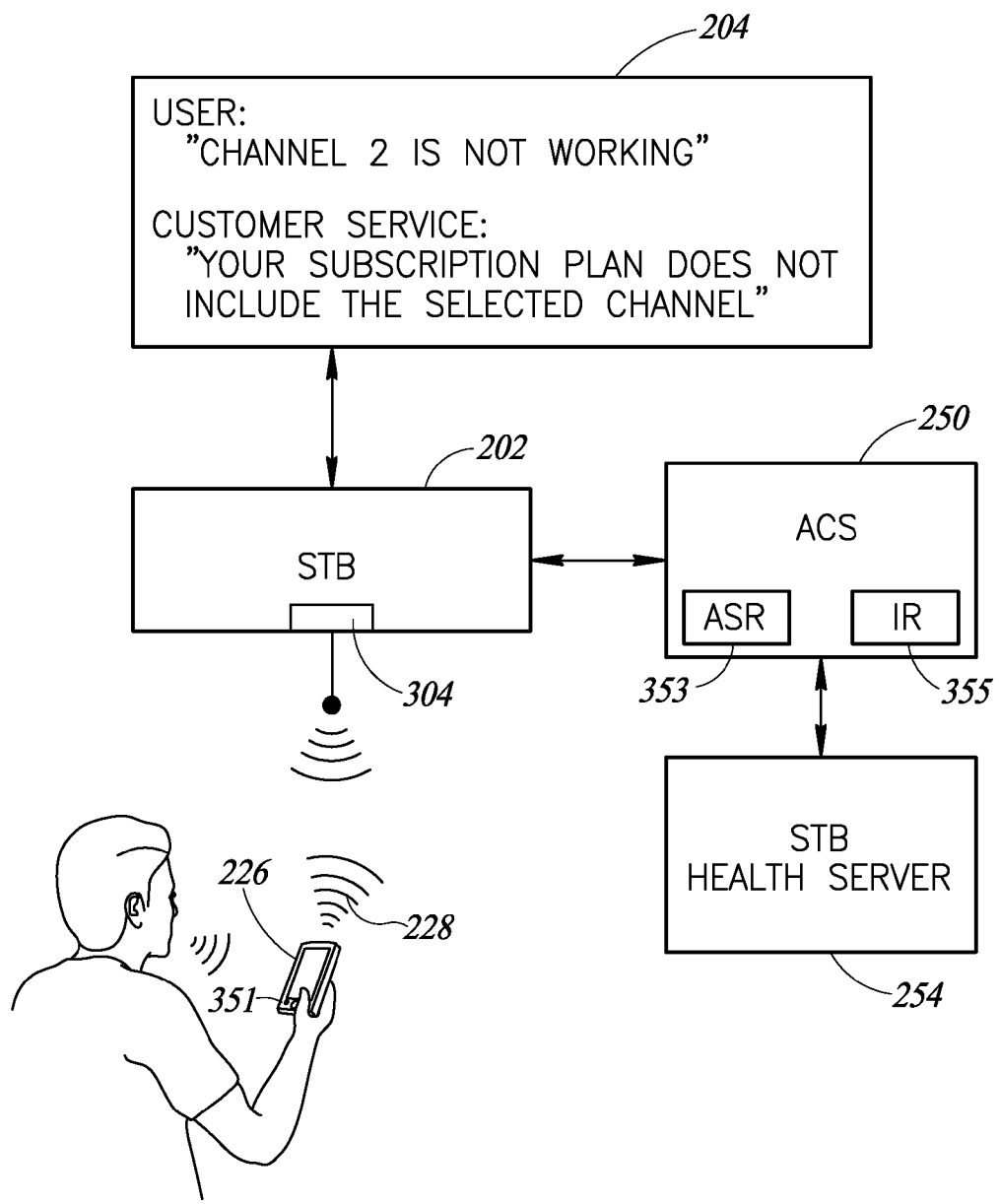
FIG. 5 is a block diagram illustrating an exchange between a viewer and the automated voice-based customer service system during operation, according to one embodiment.

FIG. 4 shows a sequence of steps in a method 400 of providing automated customer service, according to one embodiment. FIG. 5 illustrates the user's experience while requesting and receiving the automated customer service. The method 400 is performed by the automated customer service system 250. Steps shown on the left side of FIG. 4 are performed locally by subscriber equipment. Steps shown on the right side of FIG. 4 are performed by the ASR server 353 or the IR server 355, or both. Thus, steps shown on the right side of FIG. 4 may be performed either locally or remotely.

At 402, a user, e.g., the television subscriber 224, activates a voice command function causing the ACS system 250 to receive a spoken user query via the microphone 351 on the remote control 226. The voice command function can be activated, for example, by a push button, by depressing and holding a "push-to-talk" button on the remote control 226, by speaking a certain trigger command into the microphone 351, or by any other method of alerting the ACS system 250 to receive the spoken user query. Speaking directly into the remote control 226 may be more convenient for a subscriber who, for example, may only have access to a land line nearby which is not in the same room as the content receiver system 200, or who has left their mobile phone elsewhere. On the other hand, in one embodiment, a mobile phone or smart phone can be configured for use as the remote control 226, as shown in FIG. 5, in which case the built-in voice control function of the smart phone receives the spoken user query.

At 404, the microphone 351 converts the spoken user query to a corresponding voice data query and the remote control 226 transmits the voice data query to the set top box 202. Examples of a spoken user query include, "Channel 2 is not working," "I can't see any video," or "Please add channel 100 to my subscription." Viewers can also be prompted to offer feedback, in response to a video prompt, for example. A viewer may be prompted, for example, to report any errors in the electronic program guide data, which is maintained by content providers. The viewer can then answer such a prompt using the voice-based ACS system 250. An exemplary exchange between the viewer and the ACS system 250 via the display 204 is shown in FIG. 5.

At 406, the set top box 202 buffers the voice data and when a complete query is received, forwards the voice data query to the ASR server 353 for processing by the ASR engine 354. The ASR server 353 can be located remotely, and can be accessed via the existing worldwide communication infrastructure, e.g., via the Internet, satellite communication networks, and the like. The automatic speech recognition engine 354 is implemented, for example, as a set of instructions that cause a microprocessor within the ASR server 353 to interpret the voice data query once it is received by the ASR server 353. When the Internet connection is broken, regardless of the content of the voice data query, a timeout error will be received when the STB attempts to forward the voice data query to the ASR engine 354. In response to the timeout error, the STB will advance to step 424 and present an update to the subscriber on the display 204 acknowledging the lack of Internet connectivity and providing instructions to the user for restoring the network connection. Additionally or alternatively, the STB can initiate a hardware or software re-set to reestablish the Internet connection.

At 408, the ASR engine 354 performs voice recognition on the voice data query and converts the voice data query to a text query.

At 410, the ACS server 353 returns the text query to the set top box 202 for presentation on the display 204.

At 412, the set top box 202 presents the text query on the display 204 so that the subscriber 224 can view the query and verify that their request has been received and interpreted correctly. The set top box 202 can optionally request verification from the subscriber 224, for example, via a yes/no remote control selection of choices presented on the display 204. Without subscriber verification, errors in voice recognition may result in a wrong response, or no response, from the ACS system 250.

At 414, in response to a subscriber verification signal, the set top box 202 transmits the text query to the IR server 355 for processing by the IR engine 356.

At 416, the IR engine 356 interprets the text query and decides whether or not the query is within the context of inquiries that can be supported by the set top box. For example, in one embodiment, when the text query contains the words, "not" and "channel 2" the IR engine 356 will decide that the text query is within the context of supportable queries and will continue to execute the method 400. However, when the text query contains, for example, a random phrase unrelated to television viewing, the IR engine 356 will conclude that the query is not within the proper context for offering a solution to the subscriber 224.

At 418, the IR engine 356 locates a response command corresponding to the text query. When it has been determined at step 416 that the query is not contextual, the IR engine 356 will locate an appropriate response command to communicate a message to the subscriber 224, such as, for example, "Your query is not supported by subscriber customer service." Otherwise, the IR engine 356 may locate the response command in a data repository associated with the IR server 355. The response command is one of a plurality of commands that can be carried out by the set top box 202 or the subscriber 224. Examples of response commands include changing a setting internal to the set top box 202, changing a setting internal to the DVR 220, and communicating information or instructions to the subscriber 224 via the display 204. Subscriber instructions can include, for example, "Please replace your remote control battery" or, "Snow is blocking your satellite antenna from receiving a full-strength signal," or "Your subscription plan does not include the selected channel," as shown in FIG. 5.

Locating an appropriate response command entails at least searching a database of queries and associated response commands and identifying a response command that matches the query. Locating an appropriate response command may further entail consulting a separate database that stores information about the subscriber equipment. For example, the status of certain electrical components may be measured locally and transmitted by the set top box 202 to an equipment health database administered by the television service provider that makes information available to the IR engine 356. Additionally or alternatively, location of the response command may entail consulting a database that stores information about current weather conditions at the subscriber's location that may affect operation of the satellite receiving antenna 206. Additionally or alternatively, locating a response command may entail consulting a database that stores subscriber billing information, subscription plans, promotional offers, and the like. Furthermore, more than one response command can be identified in response to a single query.

At 420, the IR engine 356 transmits the response command(s), via the signal path 358, to the set top box 202 for execution.

At 422, the set top box 202 executes the response command. For example, if a response command is in the form of communicating information or instructions to the subscriber 224, execution entails presenting the instructions on the display 204, whereas if a response command involves resetting subscriber equipment, execution by the set top box 202 entails changing internal equipment settings or communicating a signal to another subscriber device to change its internal settings. For example, in response to the query, "I can't see any video," the response command identified may cause the STB to switch video inputs automatically. Switching video inputs can be executed by a set top box that is programmed to re-route video input signals, thereby effectively modifying the STB hardware configuration without requiring the user to unplug and re-plug the physical video inputs to the STB. Other response commands may cause the STB to re-set the satellite dish orientation or re-set the satellite signal to a different frequency without the user having to navigate through half a dozen menus to perform the re-set manually. If a response command is not located, the IR engine 356 can be programmed to issue a default response command that re-boots the STB.

Additionally or alternatively, the response command may entail modifying a subscription plan, for example, if the subscriber 224 decides they want to upgrade their plan instantly to include more channels.

At 424, the set top box 202 communicates an update to the subscriber 224 via the display 204. An example of such an update is a text message reporting that a setting on the subscriber equipment has changed, or that a subscription plan has changed. For example, the set top box 202 may communicate to the user, "The video input has been switched. Can you see the video now?" Multiple response commands can be executed by the set top box substantially simultaneously or in succession, for example, instructions for the subscriber 224 can be presented on the display 204 while the set top box is changing an internal setting.

The health server 254 may provide additional data to the automated customer service system 250 as described below. Furthermore, information from the health server database may be used to tailor an automated response to a spoken user query, as described herein. When the subscriber 224 initiates a query about his particular content receiver system 200, the automated customer service system 250, upon identifying the customer, will then be routed to that particular subscriber's equipment health status as stored in the database and provided by the health server 254. The automated customer service system 250 will therefore first provide to the subscriber 224 those questions or data which directly relate to the most vulnerable parts of the system for which the health server 254 has reported potential problems. Rather than having to respond to a large number of interactive computer voice messages, the subscriber will be provided with information concerning parts of his system that are vulnerable to disruption or in need of repair, and to more quickly remedy his situation. This will be a significant benefit to the subscriber 224 because queries in which a computer is responding to the caller's voice will be tailored to those points of most interest to the health of the equipment installed in his home. The automated customer service system 250 can therefore assist the subscriber 224 in solving the problem without having to transfer the telephone call to the call center and thus take the time of a customer service representative.

Further, since the automated customer service system 250 has been loaded in advance with the specific health history of the subscriber 224's equipment, if, after the initial queries to the subscriber 224 regarding the operation of this system, the automated customer service system 250 concludes that a customer service representative is needed, the transfer can occur very quickly, after just one or two interactions with the subscriber 224. This will therefore provide a quicker customer response for each customer. In the event the response cannot be immediately provided via the computer system, the subscriber 224 is quickly transferred to a human customer service representative who is able to look at the health history via his computer system and display monitor, since he will have full access to the database associated with the health server 254, as well as the interaction with the automated customer service system 250, and thus can immediately help the subscriber 224 solve the problem.

It will be appreciated that, although specific embodiments of the present disclosure are described herein for purposes of illustration, various modifications may be made without departing from the spirit and scope of the present disclosure. Accordingly, the present disclosure is not limited except as by the appended claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

The invention claimed is:

1. An automated customer service system for television subscribers, the system comprising:
   a remote control device equipped with a microphone;
   a television content receiver separate from the remote control device, the television content receiver communicatively coupled to the remote control device;
   a display coupled to the television content receiver, a video output of the television content receiver providing as an output signal to the display a first video signal that is input to a first video input of the television content receiver;
   a first server communicatively coupled to the television content receiver, the first server programmed to:
   receive voice data corresponding to a spoken query;
   decode the voice data to produce a decoded query; and
   return the decoded query to the television content receiver for presentation to a user via the display; and
   a second server communicatively coupled to the television content receiver, the second server programmed to:
   receive the decoded query from the television content receiver;
   determine whether the decoded query is an inquiry that can be supported by the television content receiver;
   receive information from a data base, the information from the database including at least one of information regarding a status of a component of the television content receiver and information regarding a subscription plan;
   select a response to the decoded query based on the information from the database;
   transmit the selected response to the television content receiver for execution by the television content receiver, the execution including automatically switching the output signal provided from the television content receiver to the display from the first video signal that is input to the first video input of the television content receiver to a second video signal that is input to a second video input of the television content receiver;
   transmit an update to the television content receiver, the update, when displayed by the display, indicating that the output signal from the television content receiver has been switched; and
   request confirmation from the user that video shown on the display has been switched.

2. The system of claim 1, further comprising a satellite antenna configured to communicate data wirelessly between the television content receiver and the first and second servers.

3. The system of claim 1 wherein the first and second servers are remote cloud-based servers coupled to the television content receiver via a network.

4. The system of claim 1 wherein functions of the first and second servers are implemented on a common server platform.

5. The system of claim 1 wherein the television content receiver is a set top box.

6. The system of claim 1, further comprising a display coupled to the television content receiver.

7. A method of providing automated customer service, the method comprising:
   receiving a spoken user query via a microphone on a remote control device;
   transmitting a voice data query corresponding to the spoken user query to one or more remote servers for identification and analysis;
   receiving the voice data query at the one or more remote servers;
   decoding the voice data query by one of the remote servers;
   receiving, by the one or more remote servers, information regarding a subscription plan;
   providing, from a video output of a television content receiver, as an output signal to a display a first video signal that is input to a first video input of the television content receiver;
   selecting, by the one or more remote servers, a response to the decoded query, the response to the decoded query including automatically switching the output signal provided from the television content receiver to the display from the first video signal that is input to the first video input of the television content receiver to a second video signal that is input to a second video input of the television content receiver;
   transmitting an update, the update, when displayed, indicating that the output signal from the television content receiver has been switched; and
   requesting confirmation from a user that video shown on the display has been switched.

8. The method of claim 7, further comprising:
   generating, by the remote server, a voice data response corresponding to the selected response to the query; and
   transmitting, by the remote server, the voice data response to a television content receiver for presentation to the user via a speaker on the remote control device.

9. The method of claim 7 wherein transmitting the voice data query to the remote server(s) is carried out by one or more intermediate devices.

10. The method of claim 9 wherein the intermediate devices include a television content receiver of a television content provider.

11. The method of claim 9 wherein the intermediate devices include a satellite antenna.

12. The method of claim 9 wherein the intermediate devices include an automatic speech recognition engine.

13. The method of claim 12 wherein the automatic speech recognition engine is implemented in the remote server.

14. An automated customer service system for a television subscriber, the system comprising:
   a remote control device equipped with a microphone;
   a display separate from the remote control device; and
   a television content receiver separate from the remote control device, the television content receiver communicatively coupled to the display and the remote control device, a video output of the television content receiver providing as an output signal to the display a first video signal that is input to a first video input of the television content receiver, the television content receiver programmed to:

receive voice data from the remote control device, the voice data corresponding to a spoken query;

transmit the voice data to a first remote server for voice recognition analysis;

receive from the first remote server decoded voice data in the form of a text query;

present the text query on the display;

transmit the text query to a second remote server;

receive from the second remote server a response command corresponding to the text query;

execute the response command, wherein execution of the response command includes automatically switching the output signal provided from the television content receiver to the display from the first video signal that is input to the first video input of the television content receiver to a second video signal that is input to a second video input of the television content receiver;

receive from the second remote server an update, the update, when displayed by the display, indicating that the output signal from the television content receiver has been switched;

cause the display to display the update; and request confirmation from a user that video shown on the display has been switched.

15. The system of claim 14, wherein the television content receiver is further programmed to:

receive a verification signal from the television subscriber; and transmit the text query to the second remote server for intent recognition analysis, in response to the verification signal.

\* \* \* \* \*